United States Patent [19]

Murakami et al.

[11] 4,174,294

[45] Nov. 13, 1979

[54] FLUORESCENT MATERIAL

[75] Inventors: Katsuo Murakami; Mitsuoki Otani; Hiroshi Ito, all of Kamakura; Kenzo Awazu, Amagasaki; Sumiaki Ibuki, Kamakura; Toshiyuki Takeda, Tokyo, all of Japan

[73] Assignee: Mitsubishi Denki Kabushiki Kaisha, Tokyo, Japan

[21] Appl. No.: 954,474

[22] Filed: Oct. 25, 1978

[30] Foreign Application Priority Data

Dec. 20, 1977 [JP] Japan .................................. 52-153473

[51] Int. Cl.² .............................................. C09K 11/46
[52] U.S. Cl. ...................... 252/301.4 P; 252/301.4 R
[58] Field of Search .................... 252/301.4 P, 301.4 R

[56] References Cited

U.S. PATENT DOCUMENTS

| 3,586,637 | 6/1971 | Blasse et al. ................... 252/301.4 P |
| 3,599,028 | 8/1971 | Wanmaker et al. ............. 252/301.4 P |

FOREIGN PATENT DOCUMENTS

| 51-1382 | 1/1976 | Japan ................................. 252/301.4 R |
| 238059 | 7/1969 | U.S.S.R. ............................ 252/301.4 P |

OTHER PUBLICATIONS

Vehara et al "J. of the Electrochem. Soc.", 1959, vol. 106, No. 3, pp. 200-205.

*Primary Examiner*—Jack Cooper
*Attorney, Agent, or Firm*—Oblon, Fisher, Spivak, McClelland & Maier

[57] ABSTRACT

A fluorescent material is an alkaline earth metal boron phosphate activated by a divalent europium compound having the formula $m(Sr_{1-x-y-p}Ba_xCa_yEu_pO)\cdot(1-n)P_2O_5nB_2O_3$ wherein parameters x, y, p, m and n are respectively in the ranges:

$0 \leq x \leq 0.5$
$0 \leq y \leq 0.2$
$0.001 \leq p \leq 0.15$
$1.75 \leq m \leq 2.30$
$0.05 \leq n \leq 0.23$

3 Claims, 6 Drawing Figures

FLUORESCENT MATERIAL

BACKGROUND OF THE INVENTION

The present invention relates to novel bluish green emitting fluorescent materials of alkaline earth metal boron phosphates activated by a divalent europium compound.

In the specification, the fluorescent material means "phosphor" and the boron phosphate means "borate phosphate".

Heretofore, it has been well-known that strontium-magnesium phosphate activated with copper $(Sr,Mg)_3(PO_4)_2:Cu$ and calcium halophosphate activated by antimony $Ca_{10}(PO_4)_6(F,Cl)_2:Sb$ are used as typical fluorescent material emitting in bluish green wavelength region under exciting it by ultraviolet radiation or cathode radiation.

However, these known fluorescent materials have disadvantages to be unsatisfactory from the practical viewpoints.

When the flourescent material of a phosphate activated by copper is used for a low pressure or high pressure mercury discharge lamp, it is difficult to avoid a trouble of a serious decrease of luminous output because the activator of copper is oxidized by heating (such as 600° C.) in a baking step (lehring) for the fluorescent material in the preparation of a flurorescent lamp.

The fluorescent material of a halophosphate activated by antimony has wide luminous regions so as to emit an emission energy even in near-ultraviolet wavelength region as invisible region. Accordingly, it is difficult to obtain satisfactory luminous efficiency by using it in a discharge lamp for lightening.

SUMMARY OF THE INVENTION

It is an object of the present invention to overcome the above-mentioned disadvantages and to provide novel bluish green emitting fluorescent materials which are not inactivated in a baking step for a preparation of a fluorescent lamp and whose luminous efficiency is high.

The foregoing and other objects of the present invention have been attained by providing a novel fluorescent material of an alkaline earth metal boron phosphate activated by a divalent europium compound having the formula $m(Sr_{1-x-y-p}Ba_xCa_yEu_pO)\cdot(1-n)P_2O_5\cdot nB_2O_3$ wherein parameters x,y,p,m and n are respectively in the ranges:

$0 \leq x \leq 0.5$
$0 \leq y \leq 0.2$
$0.001 \leq p \leq 0.15$
$1.75 \leq m \leq 2.30$
$0.05 \leq n \leq 0.23$

DETAILED DESCRIPTION OF THE PREFERRED EMBODIMENTS

Figure 1:
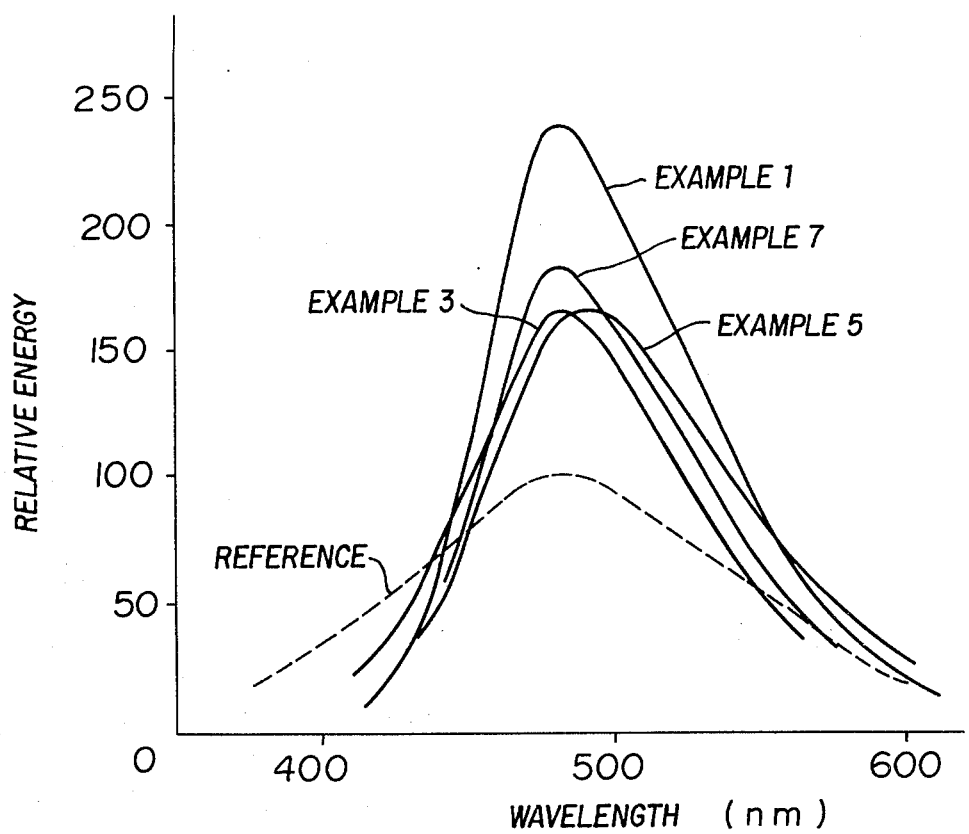

The fluorescent material of the present invention can be obtained by blending raw materials having suitable element for the formula such as $CaCO_3$, $SrCO_3$, $CaHPO_4$, $SrHPO_4$, $BaHPO_4$, $H_3BO_3$, $Eu_2O_3$ etc., at ratios for forming the formula.

The mixture is charged in a heat resistant vessel such as a silica crucible, and it is calcined at about 1,000° to 1,200° C. for suitable time in a reducing atmosphere such as a mixed gas of nitrogen and hydrogen.

The raw materials can be compounds of each element which can be converted to the corresponding oxide by a thermal decomposition. That is, hydroxides, nitrates, oxalates of each element can be used as raw materials.

The phosphate source and the boron oxide source should be used.

As described below, the fluorescent materials of the present invention emits bluish green light under exciting it by ultraviolet rays having short or long wavelength, blue visible radiation or cathode radiation.

Te fluorescent material having the formula wherein $x=0$ and $y=0$, is strontium boron phosphate having the formula

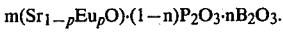

$$m(Sr_{1-p}Eu_pO)\cdot(1-n)P_2O_3\cdot nB_2O_3.$$

This fluorescent material emits bluish green light under the emission peak at 480 nm.

When barium component is added to the strontium component to be parameter x=about 0.5 as maximum content, the wavelength for the emission peak is shifted to longer wavelength side to be about 490 nm.

When calcium component is added to the strontium component, in said range of y, the emission spectrum is not substantially changed.

The maximum parameters x and y are defined to be 0.5 and 0.2, because the luminous output is remarkably decreased and blue light having the emission peak at about 410 to 430 nm is emitted if these values are higher.

The blue light has low luminous output to be low practical value.

The parameters of m and n in the formula can be selected as desired in said ranges. It is most preferable to be in the ranges of $1.9 \leq m \leq 2.1$ and $0.14 \leq n \leq 0.18$, since the maximum luminous output can be obtained by selecting the parameters of m and n in said ranges.

The europoium content as the parameter p is defined in said range, because an absorption of excited radiation is not enough and effective luminous output cannot be obtained when the parameter p is smaller whereas a quantum efficiency is too low to use in a practical purpose when the parameter p is higher.

It is most preferable to be in the range of $0.005 \leq p—0.05$ because the fluorescent material having remarkably high luminous ouptut can be obtained.

As described above, the fluorescent material of the present invention can be used for a fluorescent layer in a low pressure or high pressure mercury discharge lamp or a cathode-ray tube. It is most preferable to use in a low pressure mercury discharge lamp from the view-points of degree of luminous output and position of emission spectrum.

In the preparation of the fluorescent layer for the mercury discharge lamp, the fluorescent material is dispersed in an organic solvent (such as butyl acetate) or water containing a binder for preliminary forming a coated film such as nitrocellulose.

The fluorescent material of the present invention is chemically stable in these solvents without deterioration for a long time. In the baking process for removing the binder by heating (about 600° C.), the fluorescent material is highly stable and the luminous efficiency is not substantially decreased.

The luminous efficiency of the strontium-magnesium phosphate activated by copper as the known fluorescent material is usually decreased to about 50 to 80% by the baking process at about 600° C. whereas that of the fluorescent material of the present invention is only about 2 to 5%.

That is, the fluorescent material of the present invention has substantially no trouble in comparison with those of the known fluorescent materials.

The most important advantages of the fluorescent material of the present invention is to be excited by visible blue radiation as well as ultraviolet radiation.

The blue color mercury line spectrum at 405 nm and 436 nm emitted from a mercury discharge lamp does not substantially contribute for luminous efficiency because such blue light is quite less sensitive as visible light.

The fluorescent material of the present invention absorbs such blue light to convert it to bluish green light which is highly sensitive as visible light.

When the fluorescent material of the present invention is used for the low pressure mercury discharge lamp (fluorescent lamp), the luminous efficiency (lm/W) is at least the same or about 50% higher than that of the calcium halophosphate activated by antimony, because the fluorescent material of the present invention gives high quantum efficiency and it is excited even by the blue mercury line spectrum to concentrate luminous energy in the range of wavelength of about 440 to 570 nm and to emit substantially no energy in short wavelength region shorter than 440 nm.

The fluorescent material of the present invention has said excellent luminous characteristics and various advantageous characteristics and the industrial advantages are significant.

The present invention will be further illustrated by certain examples.

EXAMPLES 1 to 7 and REFERENCE

The raw materials were blended at ratios shown in Table 1 to obtain mixtures.

Each mixture was charged in a silica crucible and was fired at the temperature shown in Table 1 in an atmosphere of a mixed gas of nitrogen and hydrogen, for 3 hours.

The volumetric ratio of nitrogen to hydrogen was about 20:1 though it can be varied to a desired ratio. The trivalent europium was reduced to the divalent europium.

Each fired product obtained by the firing was quenched and pulverized as sieved to obtain each fluorescent material having the formula shown in Table 1.

In the emission spectrum of each fluorescent material, the wavelength for the emission peak is shown in unit of nanometer (nm). The fluorescent materials emit bluish green light having the emission peak at wavelength of about 480 to 490 nm.

A luminous output of each fluorescent material under exciting by ultraviolet radiation having wavelength of 254 nm was measured and compared with a luminous output of the known calcium halophosphate activated by antimony. A luminous output ratio (energy ratio) of each fluorescent material to the known calcium halophosphate activated by antimony as 100 is shown in Table 1.

The luminous output ratios of the fluorescent materials of the present invention were higher than 100.

TABLE 1

| Example | Chemical Formula | Raw material & ratios (mole) | | Temp. for firing (°C.) | Wavelength for emission peak (nm) | Relative luminous output |
|---|---|---|---|---|---|---|
| 1 | $2Sr_{0.98}Eu_{0.02}O \cdot 0.84P_2O_5 \cdot 0.16B_2O_3$ | $SrHPO_4$ | 1.68 | 1140 | 480 | 42 |
|  |  | $SrCO_3$ | 0.28 |  |  |  |
|  |  | $H_3BO_3$ | 0.32 |  |  |  |
|  |  | $Eu_2O_3$ | 0.02 |  |  |  |
| 2 | $2Sr_{0.84}Ba_{0.14}Eu_{0.02}O \cdot 0.84 P_2O_5 \cdot 0.16B_2O_3$ | $SrHPO_4$ | 1.68 | 1120 | 480 | 132 |
|  |  | $BaCO_3$ | 0.28 |  |  |  |
|  |  | $H_3BO_3$ | 0.32 |  |  |  |
|  |  | $Eu_2O_3$ | 0.02 |  |  |  |
| 3 | $2Sr_{0.84}Ca_{0.14}Eu_{0.02}O \cdot 0.84 P_2O_5 \cdot 0.16B_2O_3$ | $SrHPO_4$ | 1.68 | 1150 | 480 | 101 |
|  |  | $CaCO_3$ | 0.28 |  |  |  |
|  |  | $H_3BO_3$ | 0.32 |  |  |  |
|  |  | $Eu_2O_3$ | 0.02 |  |  |  |
| 4 | $2Sr_{0.68}Ba_{0.30}Eu_{0.02}O \cdot 0.84P_2O_5 \cdot 0.16 B_2O_3$ | $SrHPO_4$ | 1.36 | 1100 | 480 | 122 |
|  |  | $BaHPO_4$ | 0.32 |  |  |  |
|  |  | $BaCO_3$ | 0.28 |  |  |  |
|  |  | $H_3BO_3$ | 0.32 |  |  |  |
|  |  | $Eu_2O_3$ | 0.02 |  |  |  |
| 5 | $2Sr_{0.48}Ba_{0.50}Eu_{0.02}O \cdot 0.84 P_2O_5 \cdot 0.16B_2O_3$ | $SrHPO_4$ | 0.96 | 1070 | 490 | 107 |
|  |  | $BaHPO_4$ | 0.72 |  |  |  |
|  |  | $BaCO_3$ | 0.28 |  |  |  |
|  |  | $H_3BO_3$ | 0.32 |  |  |  |
|  |  | $Eu_2O_3$ | 0.02 |  |  |  |
| 6 | $2Sr_{0.78}Ba_{0.10}Ca_{0.10}Eu_{0.02}O \cdot 0.84 P_2O_5 \cdot 0.16B_2O_3$ | $SrHPO_4$ | 1.56 | 1140 | 480 | 128 |
|  |  | $BaHPO_4$ | 0.12 |  |  |  |
|  |  | $BaCO_3$ | 0.08 |  |  |  |
|  |  | $CaCO_3$ | 0.20 |  |  |  |
|  |  | $H_3BO_3$ | 0.32 |  |  |  |
|  |  | $Eu_2O_3$ | 0.02 |  |  |  |
| 7 | $2Sr_{0.58}Ba_{0.20}Ca_{0.20}Eu_{0.02}O \cdot 0.84 P_2O_5 \cdot 0.16B_2O_3$ | $SrHPO_4$ | 1.16 | 1140 | 480 | 107 |
|  |  | $BaHPO_4$ | 0.40 |  |  |  |
|  |  | $CaHPO_4$ | 0.12 |  |  |  |
|  |  | $CaCO_3$ | 0.28 |  |  |  |
|  |  | $H_3BO_3$ | 0.32 |  |  |  |
|  |  | $Eu_2O_3$ | 0.02 |  |  |  |
| Reference | Calcium halophosphate activated with antimony | — | — | — | 480 | 100 |

FIG. 1 shows emission spectra of the fluorescent materials of Examples 1,3,5 and 7 under exciting by ultraviolet radiation 254 nm.

As it is clear from FIG. 1, the fluorescent materials of the present invention emit most of the luminous energy in relatively narrow bluish green wavelength region and do not substantially emit the luminous energy in wavelength region shorter than about 440 nm.

In FIG. 1, the broken line shows the emission spectrum of calcium halophosphate activated by antimony, and the peaks height of the spectrum is given as 100.

The emission spectra of Examples 2,4 and 6 are not shown in FIG. 1 and they are respectively similar to those of Examples 1, 5 and 1.

Figure 2:
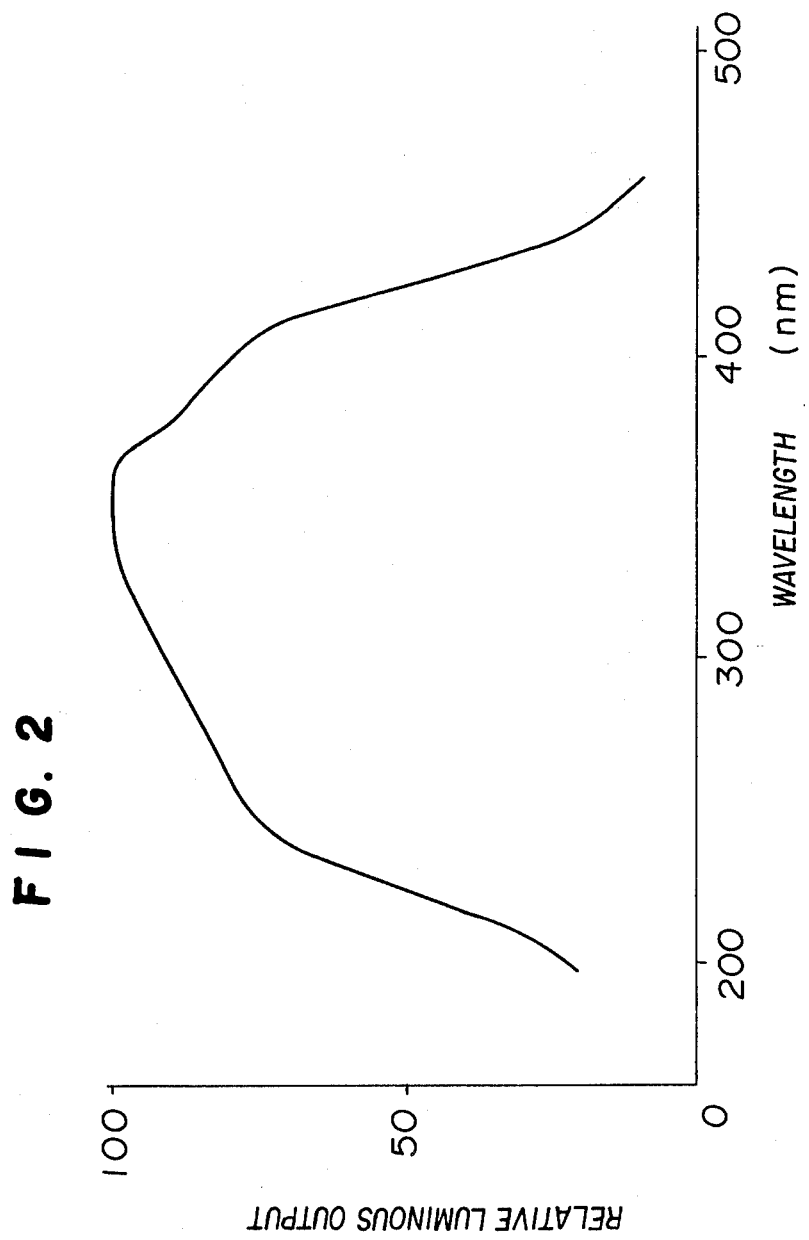

FIG. 2 shows an excitation spectrum of the fluorescent material of Example 1. In FIG. 2, the relative luminous output ratio is shown as function of wavelength of excited radiation under the consideration of the maximum luminous ouput as 100.

As it is clear from FIG. 2, the fluorescent material of the invention is satisfactorily excited even by ultraviolet radiation having short wavelength or long wavelength and also by visible blue radiation.

The excitation spectra of the fluorescent materials of Examples 2 to 7 are substantially the same with that of Example 1.

Each straight tube type fluorescent lamp (40W) was prepared by using the fluorescent material of Example 1 and 3 and the known calcium halophosphate activated by antimony and the characteristics of each lamp were tested. The results are shown in Table 2.

Table 2

| Fluorescent material | Luminous efficiency at zero hour of lightening (lm/W) A | Luminous efficiency at 500 hours of lightening (lm/W) B | Maintenance factor % 100 × (B/A) |
| --- | --- | --- | --- |
| Example 1 | 68.2 | 66.9 | 98.1 |
| Example 3 | 47.0 | 46.2 | 98.3 |
| Calcium halophosphate activated with antimony | 45.0 | 42.4 | 94.2 |

It is clear from Table 2 that the fluorescent lamps using the fluorescent materials of the present invention have excellent superior characteristics on the luminous efficiency and the maintenance factor to those of the reference.

Various fluorescent materials were prepared by varying parameters m,n and p in the formula of Example 1 and the luminous outputs of the fluorescent materials were measured. The results are shown in FIGS. 3,4 and 5.

Figure 3:
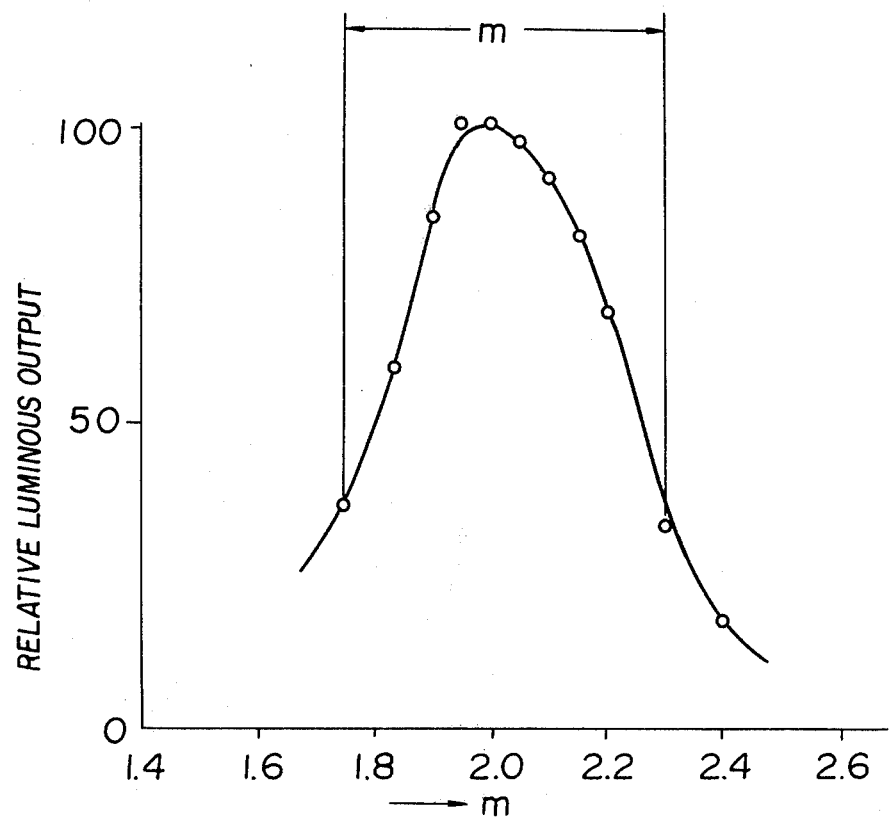

FIG. 3 shows a relation of the relative luminous outputs to the value m of the fluorescent materials having the formula $m(Sr_{0.89}Eu_{0.02}O) \cdot 0.84P_2O_5 \cdot 0.16B_2O_3$ (excited by ultraviolet radiation having wavelength of 254 nm).

It is clear from FIG. 3, that effective luminous output is obtained in the range of m=1.75 to 2.30 especially m=1.90 to 2.10.

Figure 4:
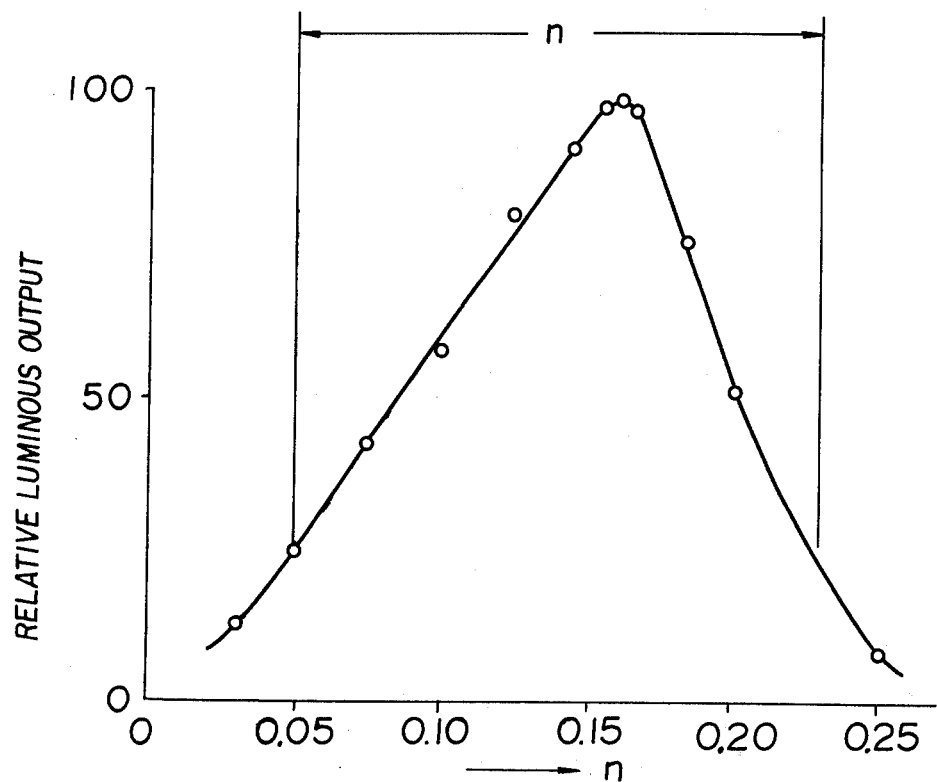
Figure 5:
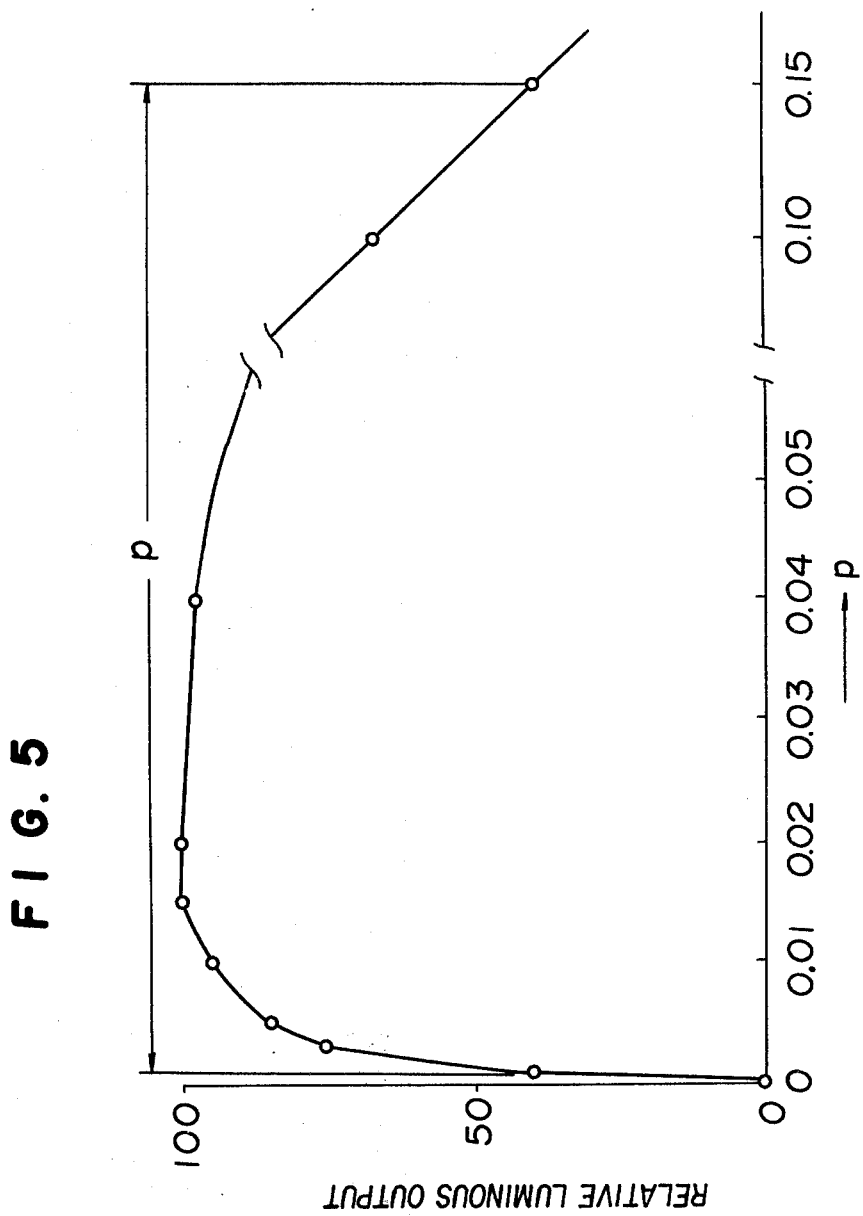

FIG. 4 shows the relation of the relative luminous outputs to the value n of the fluorescent materials having the formula $$(SR_{0.98}Eu_{0.02}O) \cdot (1-n)P_2O_5 \cdot nB_2O_5.$$

It is clear from FIG. 4, the specific lumination according to the present invention can be given in a range of n=0.05 to 0.23, and high luminous output can be given in a range of n=0.14 to 0.18.

FIG. 5 shows a relation of the relative luminous outputs to the value p of the fluorescent materials having the formula $$(Sr_{1-p}Eu_pO)0.84P_2O_5 \cdot 0.16B_2O_3.$$

It is clear from FIG. 5, effective luminous output is obtained in a range of p=0.001 to 0.15 and especially in a range of p=0.005 to 0.05.

In these figures, strontium was used as the alkaline earth metal. Thus, it was confirmed that the substantially same tendency is given in the case of barium or calcium when the content is in said range.

As it is clear from these examples and description, the fluorescent materials of the present invention are alkaline earth boron phosphates activated by divalent europium compound.

According to various analyses such as X-ray diffraction analysis, chemical elementary analysis and luminous characteristic analysis, it was found that these fluorescent materials are in a form of single compound though a crystalline structure is not clearly found.

In the X-ray diffraction analysis, the fluorescent materials of the present invention impart the specific X-ray diffraction data.

When the parameter m or n of the fluorescent material is out of said range, a different compound is partially formed together with the fluorescent material of the present invention.

That is, in the latter case, the different diffraction fringe which is different from the specific diffraction fringe of the fluorescent material of the present invention is found and the luminous output is lowered, as practical disadvantageous problems.

Figure 6:
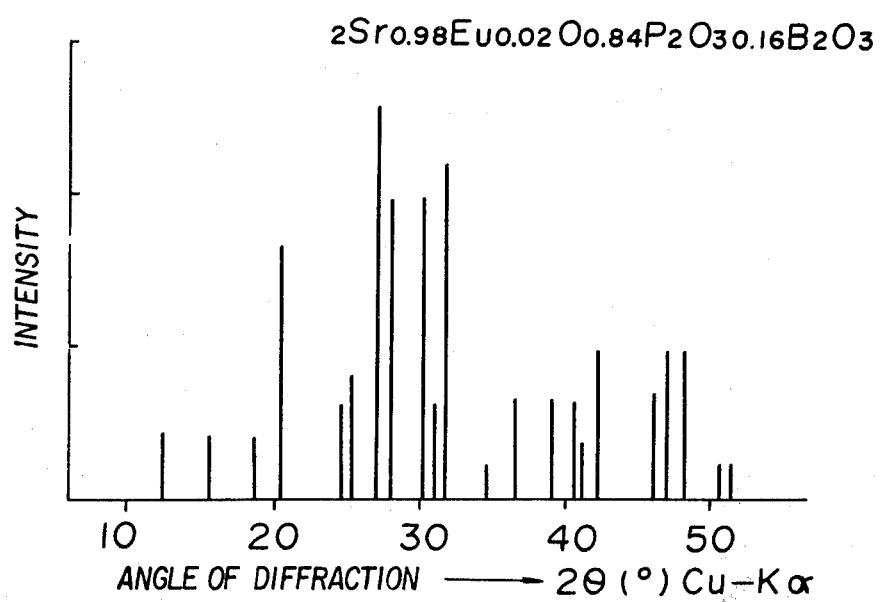

FIG. 6 shows X-ray diffraction spectrum of the fluorescent material of Example 1.

EXAMPLE 8 (Preparation)

The fluorescent material of Example 1 was prepared as follows.

| | |
| --- | --- |
| SrHPO₄ | 308.4g (1.68 mole) |
| SrCO₃ | 41.33g (0.28 mole) |
| H₃BO₃ | 19.74g (0.32 mole) |
| Eu₂O₃ | 7.04g (0.02 mole) |

The raw materials were charged in a ball mill made of alumina, and mixed and pulverized to prepare a mixture. The mixture was charged in a silica crucible and fired at 1140° C. for 3 hours in an electric furnace in an atmosphere of a mixed gas of nitrogen and hydrogen (volumetric ratio of N:H=20:1). The fired product was quenched and pulverized and sieved. The resulting fluorescent material emitted bluish green light under exciting it by ultraviolet radiation or cathode radiation.

According to a chemical analysis, the result was substantially confirmed with that of the compound $2Sr_{0.98}Eu_{0.02}O \cdot 0.84\ P_2O_5\ 0.16B_2O_3$.

According to X-ray diffracton analysis of the fluorescent material, the X-ray- diffraction spectrum being substantially the same with FIG. 6 was obtained.

EXAMPLE 9 (Preparation)

| | |
| --- | --- |
| SrHPO₄ | 308.4g (1.68 mole) |

-continued

| | |
|---|---|
| Sr(NO₃)₂ | 59.26g (0.28 mole) |
| H₃BO₃ | 19.79g (0.32 mole) |
| Eu₂O₃ | 7.04g (0.02 mole) |

The raw materials were mixed with 500 cc of water and they were thoroughly stirred and dried on an evaporating dish in a drier heated at 150° C. The dried mixture was charged in a silica crucible and fired at 1130° C. for 2 hours in a mixed gas of nitrogen and hydrogen (volumetric ratio of N:H=20:1) containing 1.5 vol % of steam. The product was quenched and pulverized and sieved to obtain th fluorescent material having the same formula with that of Example 1. The fluorescent material can be used without any treatment.

EXAMPLE 10 (Preparation)

The raw materials of Example 8 were charged and mixed in a ball mill. The mixture was charged in a silica crucible and fired at 1000° C. for 1 hour in air. The product was quenched and pulverized and sieved and then, the product was further fired at 1150° C. for 1.5 hours in a mixed gas of Example 9 containing 1.5 vol % of steam. The product was quenched and pulverized and sieved to obtain the fluorescent material of the present invention.

The fluorescent material emitted bright bluish green light under exciting it by ultraviolet radiation or cathode radiation.

What is claimed is:

1. An alkaline earth metal boron phosphate fluorescent material activated by divalent europium having the formula $m(Sr_{1-x-y-p}Ba_xCa_yEu_pO)\cdot(1-n)P_2O_5\cdot nB_2O_3$ wherein parameters x,y,p,m, and n are respectively in the ranges:
   $0 \leq x \leq 0.5$
   $0 \leq y \leq 0.2$
   $0.001 \leq p \leq 0.15$
   $1.75 \leq m \leq 2.30$ and
   $0.05 \leq n \leq 0.23$ 2. A fluroescent material according to claim 1 wherein the parameters m and n are in the ranges:
   $1.9 \leq m \leq 2.1$ and
   $0.14 \leq n \leq 0.18$ 3. A fluorescent material according to claim 1 wherein the parameter p is in the range:
   $0.005 \leq p \leq 0.05$

* * * * *